United States Patent
Farrell

(10) Patent No.: US 11,707,058 B1
(45) Date of Patent: Jul. 25, 2023

(54) SYSTEM AND METHOD FOR REDUCING BIRD COLLISIONS WITH GLAZING

(71) Applicant: Stephens Smith Farrell, Black Mountain, NC (US)

(72) Inventor: Stephens Smith Farrell, Black Mountain, NC (US)

( * ) Notice: Subject to any disclaimer, the term of this patent is extended or adjusted under 35 U.S.C. 154(b) by 0 days.

(21) Appl. No.: 17/982,829

(22) Filed: Nov. 8, 2022

Related U.S. Application Data

(63) Continuation of application No. 17/543,140, filed on Dec. 6, 2021, now Pat. No. 11,490,612.

(60) Provisional application No. 63/121,510, filed on Dec. 4, 2020.

(51) Int. Cl.
| | |
|---|---|
| *A01M 29/10* | (2011.01) |
| *F21V 11/08* | (2006.01) |
| *E06B 7/28* | (2006.01) |
| *E06B 3/663* | (2006.01) |
| *F21Y 103/10* | (2016.01) |
| *F21Y 115/10* | (2016.01) |

(52) U.S. Cl.
CPC ......... *A01M 29/10* (2013.01); *E06B 3/66309* (2013.01); *E06B 7/28* (2013.01); *F21V 11/08* (2013.01); *F21Y 2103/10* (2016.08); *F21Y 2115/10* (2016.08)

(58) Field of Classification Search
CPC ...... A01M 29/10; E06B 3/66309; E06B 7/28; F21V 11/08
See application file for complete search history.

(56) References Cited

U.S. PATENT DOCUMENTS

| | | | |
|---|---|---|---|
| 11,419,326 B2 * | 8/2022 | Ravuna | A01M 29/32 |
| 11,434,688 B2 * | 9/2022 | Holtstiege | E06B 3/66314 |
| 2009/0104369 A1 | 4/2009 | Rajala et al. | |
| 2010/0098844 A1 * | 4/2010 | Pettinger | F03D 80/00 |
| | | | 427/164 |
| 2015/0160385 A1 * | 6/2015 | Hicks | B44C 1/10 |
| | | | 359/359 |
| 2016/0041319 A1 * | 2/2016 | Hicks | E06B 7/28 |
| | | | 359/359 |
| 2020/0281188 A1 * | 9/2020 | Donoho | A01M 29/12 |
| 2022/0264868 A1 * | 8/2022 | Just | H02K 11/0094 |

* cited by examiner

*Primary Examiner* — Bryon T Gyllstrom
(74) *Attorney, Agent, or Firm* — Schwartz Law Firm, P.C.

(57) ABSTRACT

A system and method for reducing bird collisions with glazing utilizes a UV light source and a perforated opaque object. The UV light source is located adjacent an edge of a glass panel and is configured to project UV light rays onto a planar surface of the glass panel. The perforated opaque object is located between the UV light source and the planar surface of the glass panel, such that UV light rays passing through the perforated object cast onto the planar surface of the glass panel a UV shadow visible to birds and substantially invisible to humans.

20 Claims, 8 Drawing Sheets

SYSTEM AND METHOD FOR REDUCING BIRD COLLISIONS WITH GLAZING

TECHNICAL FIELD AND BACKGROUND OF THE DISCLOSURE

The present disclosure relates broadly and generally to a system and method for reducing bird collisions with glazing, such as window glazing common in residential and commercial buildings.

According to the American Bird Conservancy, millions of birds die each year from collisions with window glass or glazing. Birds do not recognize the glazing as solid and interpret the reflections of the sky or terrain behind the direction of flight for open sky ahead. Over half of all human related bird mortality is caused by collisions with glazing. Recognizing this problem, many municipalities presently require "bird safe" glazing building designs. Current programs certifying sustainability in the built environment also reward these systems and/or practices.

Coupled with the loss of habitat and death by non-indigenous house cats, collisions with glazing are having a devastating effect on wild bird populations. Many of the systems or products available to designers and building owners are expensive, of limited efficacy, unattractive, and/ or unappealing. No present system or product on the market is practical at scale for retrofitting. Preventing avian death due to window glazing collision is critical for the stabilization of our endangered wild bird populations. The exemplary system and method of the present disclosure may play an essential role in wild bird population stabilization and recovery.

Referring to the diagram in FIG. 1, research has discovered that avian eyesight is considerably different than human eyesight. Human eyesight is limited to wavelengths ranging from about 400 to 800 nanometers—commonly referred to as "visible light." Birds can perceive this range as well but can also see light at wavelengths from 300 to 400 nanometers, the so called "near UV range" which is otherwise invisible to the naked human eye. In exemplary embodiments, the system and method of the present disclosure seeks to exploit this characteristic by projecting a UV light pattern onto the exterior-most plane of the window assembly. Birds perceive the UV light pattern and maneuver to avoid colliding with the glazing.

SUMMARY OF EXEMPLARY EMBODIMENTS

Various exemplary embodiments of the present disclosure are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It is also noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

According to one exemplary embodiment, the present disclosure comprises a system for reducing bird collisions with glazing. The system includes a glass panel, a UV light source, and a perforated opaque object. The UV light source is located adjacent an edge of the glass panel and is configured to project UV light rays onto a planar surface of the glass panel. The perforated opaque object is located between the UV light source and the planar surface of the glass panel, such that UV light rays passing through the perforated object cast onto the planar surface of the glass panel a UV shadow visible to birds and substantially invisible to humans. The UV light rays that go through the perforations past edges of the object make an outline for the shadow. The exemplary UV shadow may comprise a grid, checkered, hatching or cross-hatching pattern, or any other image or design sufficient to occupy substantially the entire planar surface of the glass panel.

The phrase "substantially invisible to humans" means light (shadow images) which cannot readily be seen by humans with the naked eye. In other words, light with wavelengths less than approximately 420 nanometers.

The term "glazing" refers broadly herein to the glass (e.g., glass panes or sheets) or other substantially transparent material incorporated into an article, such as window frames, walls, partitions or other such structure. Exemplary glazing may comprise a single-pane or multiple-pane window commonly used in residential and commercial buildings. Glazing may also be integrated in billboards and other signage.

A conventional double-pane window 10 of the prior art is illustrated in FIG. 1. The window (or "glazing") 10 includes outside and inside glass panes 11, 12 separated by spacers 14, 15 and typically encased in a frame not shown. The glass panes 11, 12 define an airspace 16 between the two facing internal planar surfaces 11A, 12A. The external planar surface 11B of the outside glass pane 11 is exposed to the environment outside of the building, while the external planar surface 12B of the inside glass pane 12 faces an inside of the building.

The term "glass" means any non-crystalline transparent or translucent amorphous solid.

According to another exemplary embodiment, the glass panel comprises a multi-pane window.

According to another exemplary embodiment, an elongated spacer separates adjacent panes of the multi-pane window.

According to another exemplary embodiment, the UV light source comprises a UV LED light strip residing adjacent the spacer inside of the multi-pane window.

According to another exemplary embodiment, the UV LED light strip incorporates a plurality of spaced linear UV LED chips operatively mounted on a thin rectangular flexible printed circuit board.

According to another exemplary embodiment, the flexible printed circuit board has an adhesive backing configured to adhere the UV LED light strip to the spacer inside of the multi-pane window.

According to another exemplary embodiment, the perforated opaque object is a rectangular plastic mesh strip substantially coextensive with the rectangular UV LED light strip. The term "substantially coextensive" means having substantially the same length and width dimension within a range of +/−10%.

According to another exemplary embodiment, the UV light source generates light rays with a wavelength less than 400 nanometers.

According to another exemplary embodiment, the UV light source generates light rays covering a wavelength spectrum from about 100 nanometers to about 400 nanometers; and more particularly, between about 300 nanometers to 400 nanometers.

According to another exemplary embodiment, the UV light source generates UV-A light rays.

In another exemplary embodiment, the present system incorporates an elongated light housing, a UV light source, and a perforated opaque object. The light housing is adapted to reside adjacent an edge of a glass panel. The UV light source is located within the housing and is configured to project UV light rays onto a planar surface of the glass panel. The perforated opaque object is located in a path of UV light rays generated by the UV light source, such that UV light rays passing through the perforated object cast onto the planar surface of the glass panel a UV shadow visible to birds and substantially invisible to humans.

In yet another exemplary embodiment, the present disclosure comprises a method for reducing bird collisions with glazing. The method includes locating a UV light source adjacent an edge of a glass panel. UV light rays are projected from the UV light source onto a planar surface of the glass panel. A perforated opaque object is located between the UV light source and the planar surface of the glass panel, such that UV light rays passing through the perforated object cast onto the planar surface of the glass panel a UV shadow visible to birds and substantially invisible to humans.

BRIEF DESCRIPTION OF THE DRAWINGS

Exemplary embodiments of the present disclosure will hereinafter be described in conjunction with the following drawing figures, wherein like numerals denote like elements, and wherein.

DESCRIPTION OF EXEMPLARY EMBODIMENTS AND BEST MODE

Figure 1:
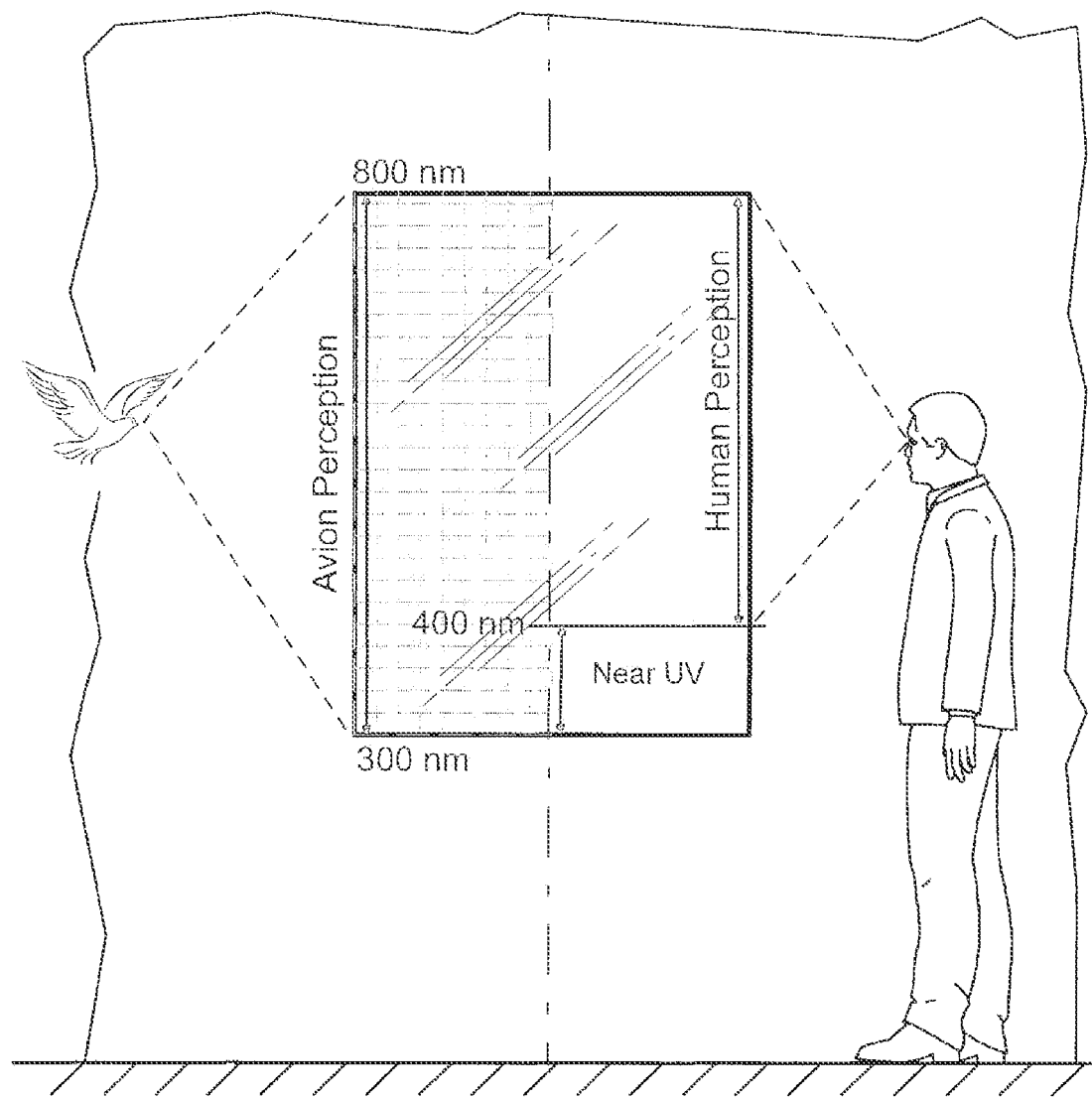
FIG. 1 is a chart illustrating differences between avian eyesight and human eyesight within certain wavelength ranges.

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Referring now specifically to the drawings, the present disclosure comprises a system and method for reducing bird collisions with glazing, such as single or multi-pane windows. In an exemplary embodiment shown in FIG. 3, certain elements and features of the disclosure are incorporated in a double-pane window 20 at the time of manufacture. Like window 10 of the prior art (FIG. 2), the double-pane window 20 includes outside and inside glass panes 21, 22 separated by spacers 24, 25, and defining an interior airspace 26 between two facing internal planar glass surfaces 21A, 22A. The external planar surface 21B of the outside glass pane 21 is exposed to the environment outside of the building, while the external planar surface 22B of the inside glass pane 22 faces an inside of the building. As described further below, the exemplary window 20 incorporates a UV LED light strip 30 and a plastic (opaque) mesh strip 32—both residing in the airspace 26 between the outside and inside glass panes 21, 22.

Figure 3:
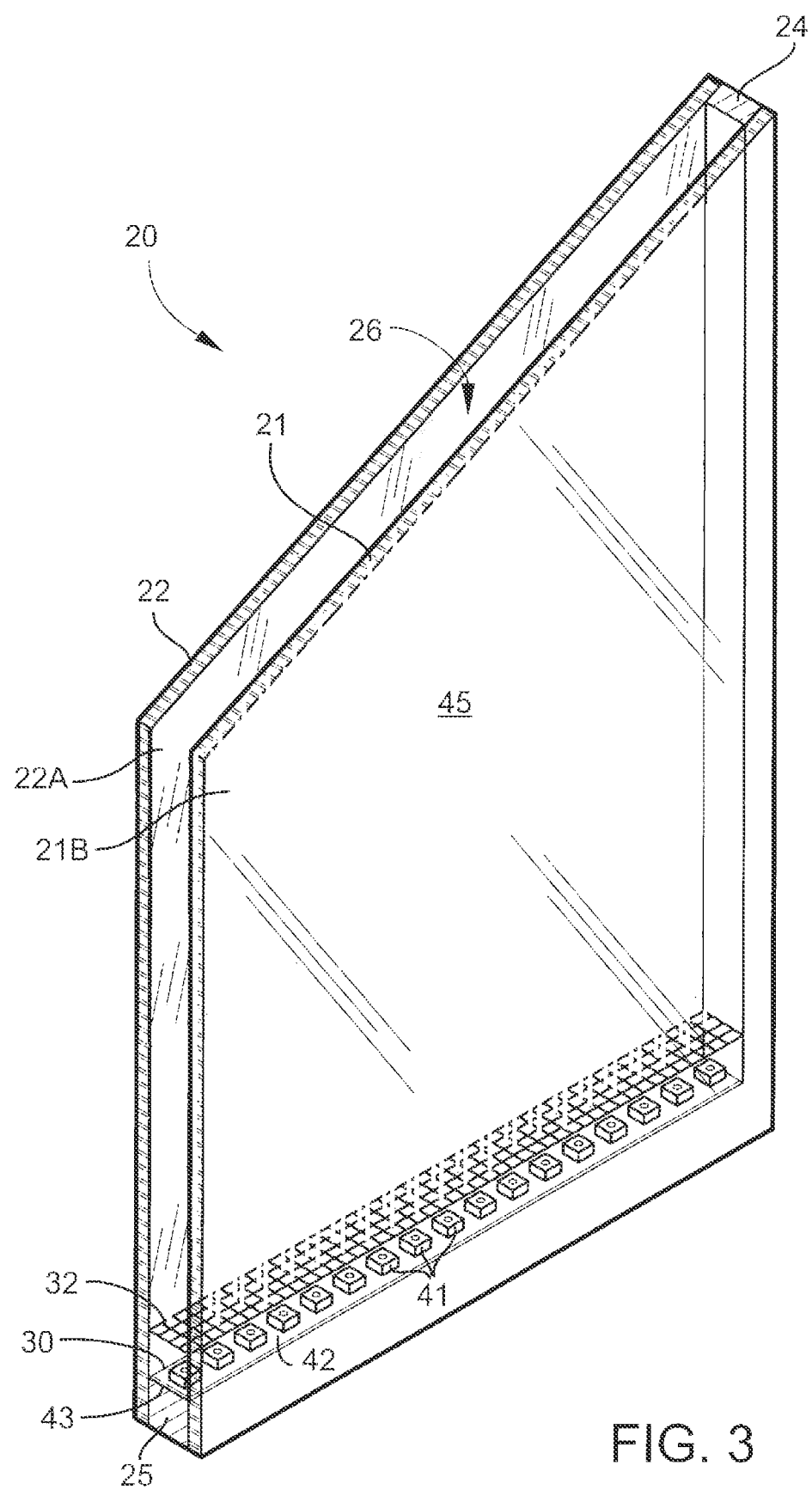
FIGS. 3 and 4 are cross-sectional views of a double-pane window incorporating elements and features of the present disclosure according to one exemplary embodiment.
Figure 4:
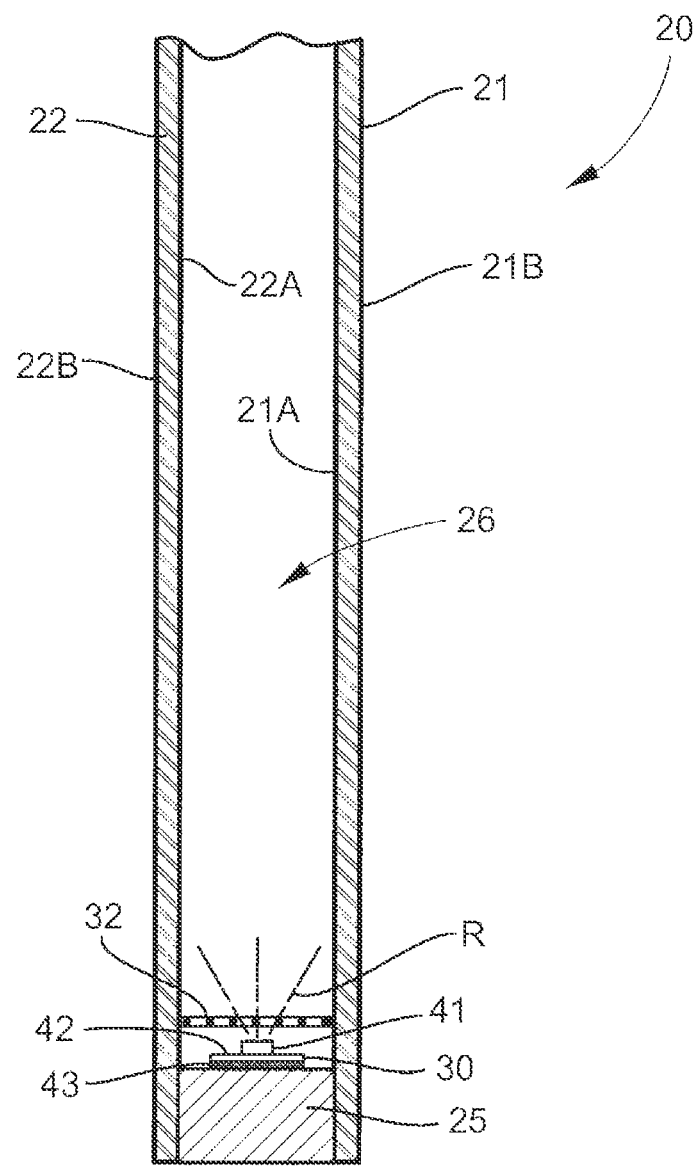

Referring to FIGS. 3 and 4, the UV LED light strip 30 includes a number of spaced apart linear double-density UV LED chips 41 operatively mounted on a thin rectangular flexible printed circuit board (PCB) 42. The PCB 42 has a strong thermal-resistant adhesive backing 43 which serves to adhere the UV LED light strip 30 directly to the spacer 25 inside the window 20. The exemplary window 20 may incorporate one or multiple UV LED light strips 30 attached to respective spacers 24, 25 adjacent bottom, top and/or side edges of the glass panes 21, 22. The UV LED light strip 30 produces UV light rays at a 120-degree beam angle, may be fully dimmable, and may be solar powered or powered using DC batteries or a wired AC plug-in connection. The rectangular plastic mesh strip 32 is spaced apart from and substantially coextensive with the rectangular UV LED light strip 30 inside the window 20. In one example, the plastic mesh strip 32 resides in a plane parallel to the plane of PCB 42 and at distance of between 1-3 inches from the LED chips 41. The exemplary mesh strip 32 is constructed of a flexible opaque plastic with 2-5 uniformly-sized openings per square inch.

When activated, the UV LED light strip 30 projects UV light rays "R" outwardly through the mesh openings of the plastic strip 32. The mesh strip 32 is suitably positioned between the UV LED light strip 30 and the glass panes 21, 22 of window 20, such that UV light rays "R" passing through the mesh strip 32 cast onto the planar surfaces 21A, 22A a UV shadow 45 visible to birds and substantially invisible to humans—e.g., at a wavelength less than about 420 nanometers. The UV shadow 45 appears on the external planar surface 21B of the outside glass pane both day and night, and is readily visible to birds flying towards the window 20. The opaque edges of the mesh strip 32 make an outline for the UV shadow 45. The exemplary UV shadow 45 may comprise a grid, checkered, hatching or cross-hatching pattern, or any other unnatural image or design sufficient to occupy substantially the entire planar surface of the outside glass pane 21. Alternatively, the UV shadow 45 may comprise light rays at a wavelength less than 400 nanometers; and more particularly, between about 300 nanometers to 400 nanometers (UV-A rays).

Figure 2:
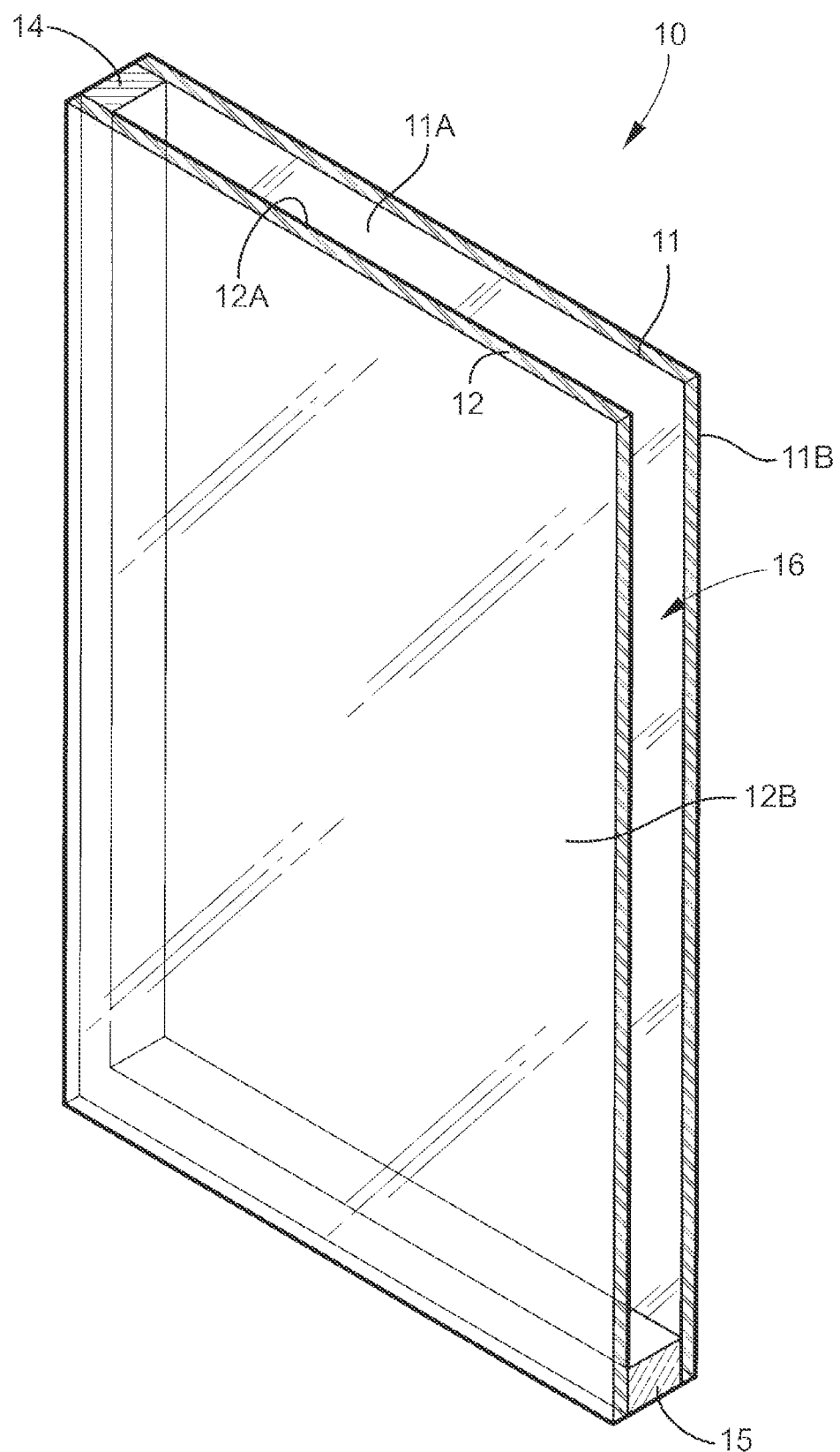
FIG. 2 is a cross-sectional perspective view of an exemplary double-pane (or double-glaze) window of the prior art.
Figure 5:
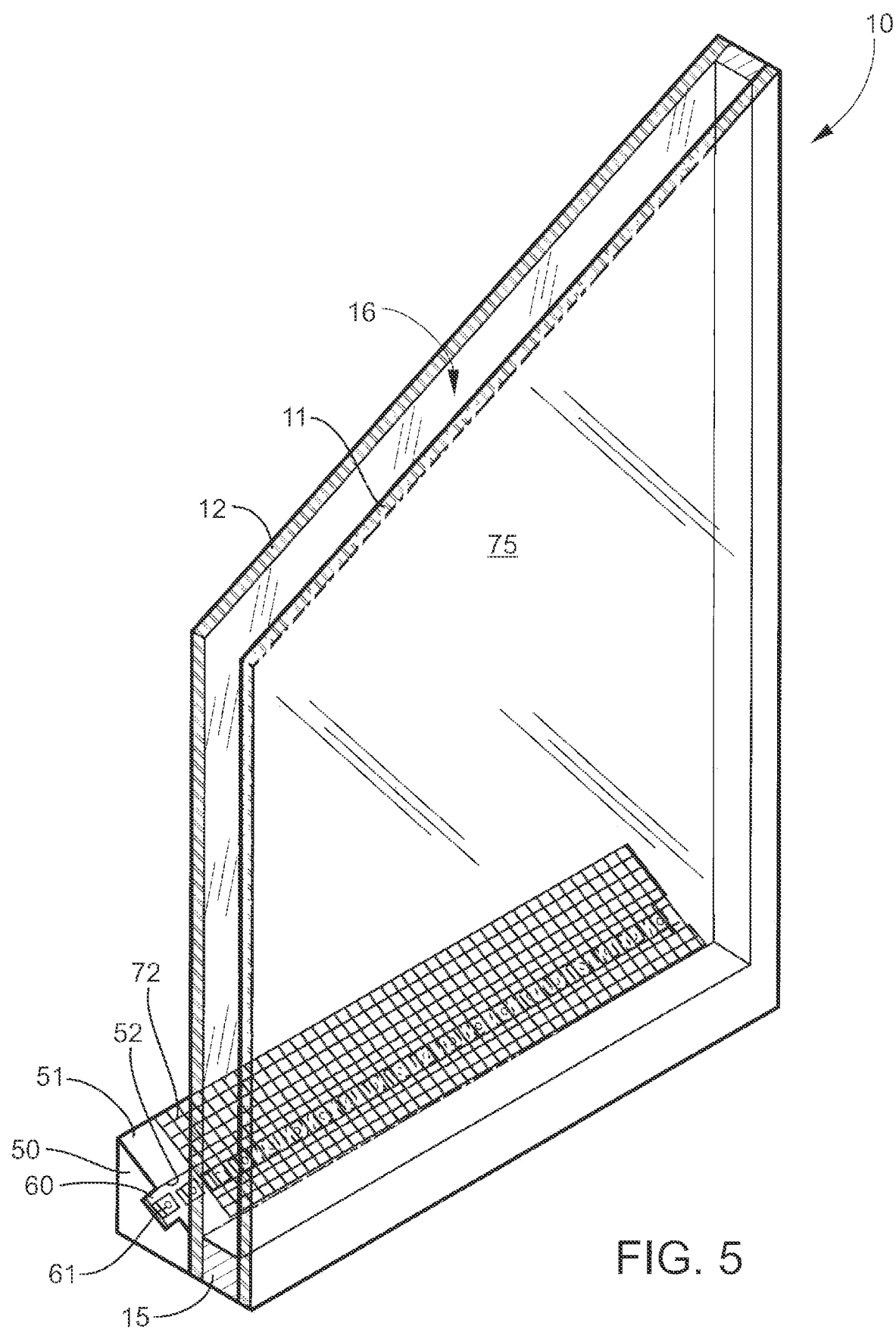
FIGS. 5 and 6 are cross-sectional views of a double-pane window incorporating elements and features of the present disclosure according to a further exemplary embodiment—particularly applicable for retrofit installations.
Figure 6:
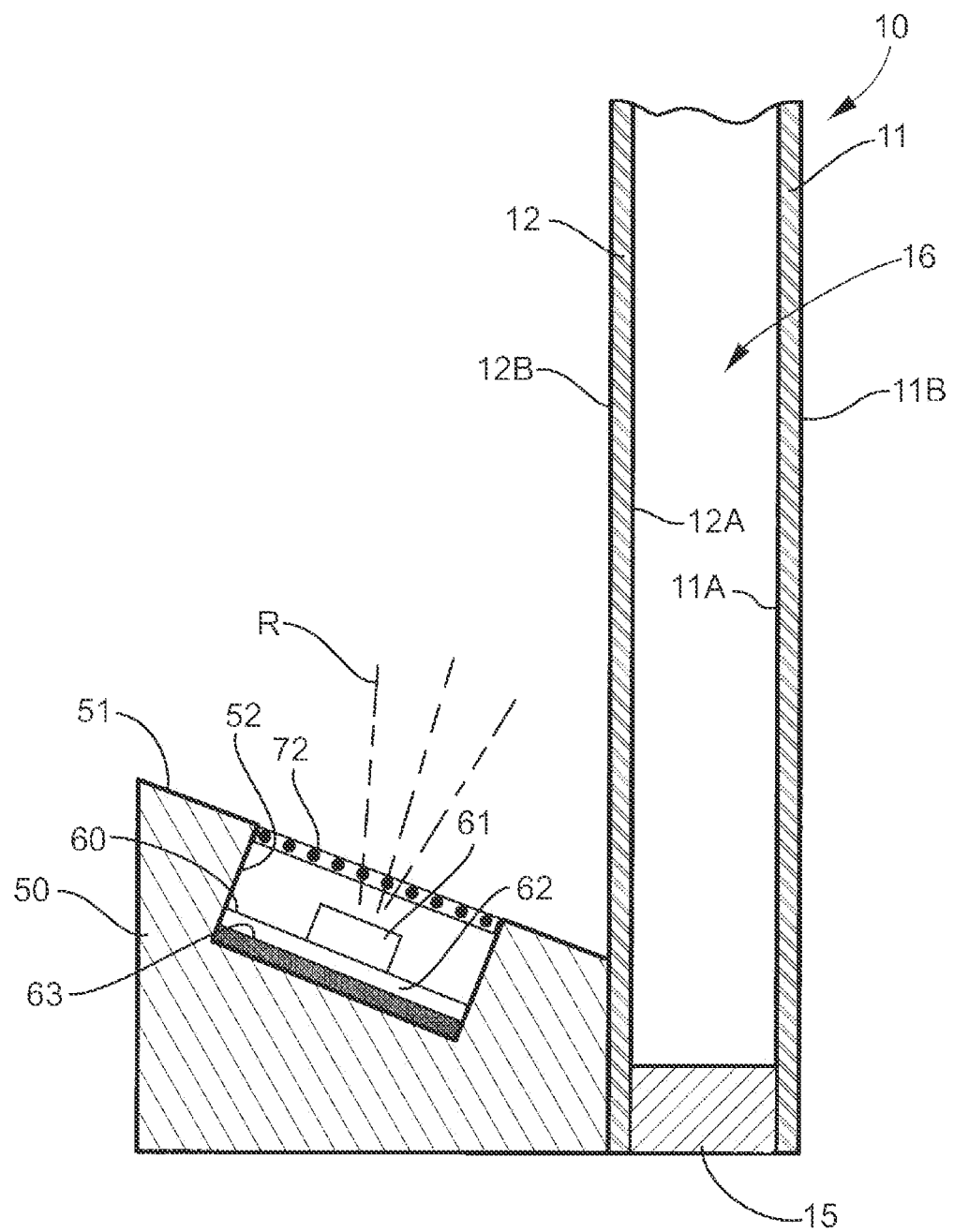

A further exemplary embodiment of the present disclosure is illustrated in FIGS. 5 and 6. In this embodiment, the disclosure incorporates an elongated low-profile housing 50 designed to mount using brackets or other suitable hardware (not shown) directly adjacent an edge of the glazing. The exemplary glazing may comprise a conventional double-pane glass window 10, as shown in FIG. 2. The housing 50 has a slanted top 51 defining a comparably-slanted recessed channel 52 configured to receive a UV LED light strip 60, such as the light strip 30 described above. The UV LED light strip 60 comprises a number of spaced apart linear double-density UV LED chips 61 operatively mounted on a thin rectangular flexible printed circuit board (PCB) 62. The UV LED light strip 60 attaches to the bed of recessed channel 52 using a thermal-resistant adhesive 64 such that the PCB 62 resides in a plane substantially parallel to a plane of the slanted top 51. A rectangular plastic mesh strip 72, such as that identical to mesh strip 32, is attached to the slanted top 51 and extends over the recessed channel 52 above the UV LED light strip 60. In one example, the plastic mesh strip 72 resides in a plane parallel to the plane of PCB 62 and at distance of between 1-3 inches from the LED chips 61.

Figure 7:
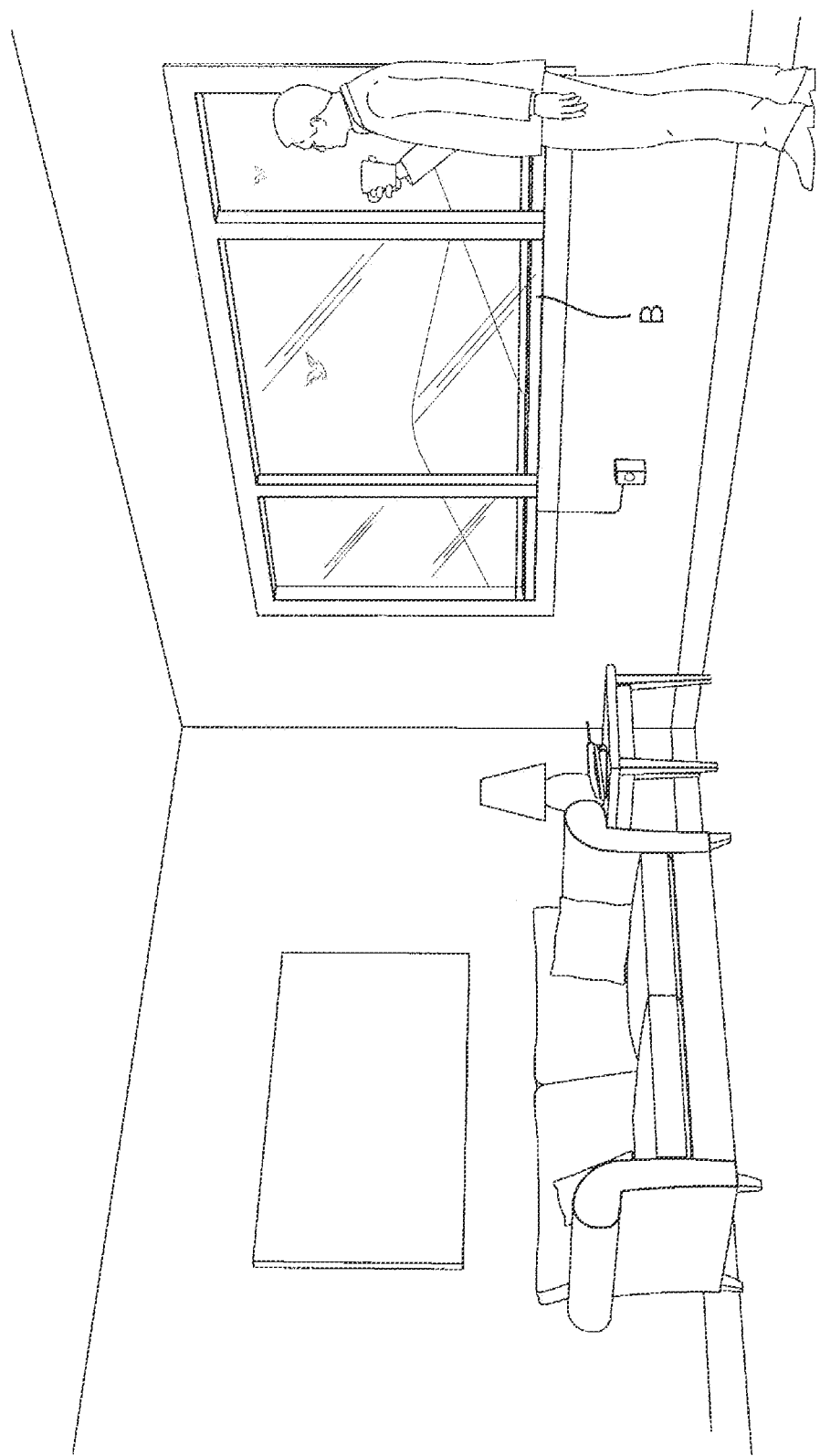
FIGS. 7 and 8 are environmental views showing exemplary embodiments of the present disclosure incorporated in residence and office buildings, respectively.
Figure 8:
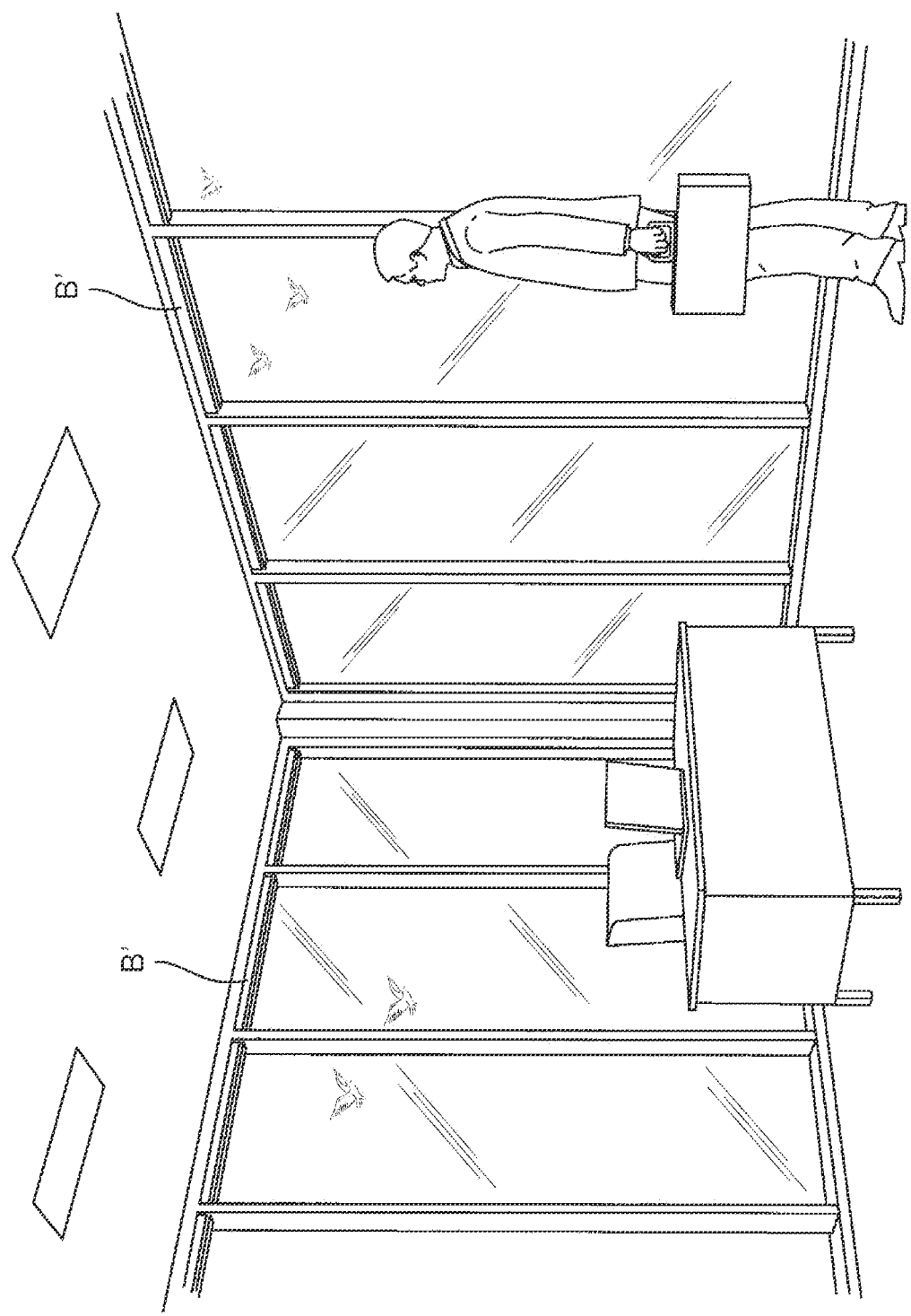

When the UV LED light strip 60 is activated, UV light rays "R" project through the mesh openings of the plastic strip 72 as described above. The UV LED light strip 60 and mesh strip 72 are suitably angled relative to the glass window 10, such that UV light rays "R" passing through the mesh strip 72 cast onto the external planar surface 12B of the window 10 a UV shadow 75 visible to birds (through outside glass pane 11) and substantially invisible to humans. As previously described, the UV shadow 75 appears on the planar surface 12B of the inside glass pane 12 both day and night, and is readily visible to birds flying towards the window 10. The exemplary system of this embodiment is easily installed in building with existing single or multi-pane windows. The UV LED light strip 60 may be solar powered or powered using DC batteries or a wired AC plug-in connection. FIGS. 7 and 8 are environmental views showing embodiments of the disclosure indicated generally at broad references B and B' in a residence and commercial office building.

In yet another exemplary embodiment, the present disclosure involves the "sputtering" of aluminum nanoparticles onto molten glass during the manufacture of new glazing. One prior art technique for modifying glass surfaces in a similar manner is described in United States Publication No. US/2009/0104369A1. The complete disclosure of this prior art is incorporated herein by this reference. In this embodiment, the external planar surface of the outside glass pane of the window is modified through a process which produces aluminum nanoparticles, deposits the aluminum nanoparticles on the planar surface, provides energy to the particles and/or planar surface so that the nanoparticles are at least partly diffused/dissolved into the window. Because aluminum is highly reflective of UV light, the modified planar surface of the glass pane would purportedly alert those taxa of birds that can perceive UV light of the presence of the glass window, thereby reducing the likelihood of a window collision. This aluminum UV reflectivity would not be visible to humans and would not require the use of grid or photo-voltaic electricity. The modified glass pane with aluminum nanoparticles may be used separately as a means for reducing bird collisions with glazing, or may be used in combination with the other embodiments of the present disclosure shown in the drawings and described above.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under 35 U.S.C. § 112(f) [or 6th paragraph/pre-AIA] is not intended. Additionally, it is not intended that the scope of patent protection afforded the present invention be defined by reading into any claim a limitation found herein that does not explicitly appear in the claim itself.

What is claimed:

1. A system for reducing bird collisions with glazing, said system comprising:
   a glass panel;
   a UV light source configured to project UV light rays onto a planar surface of said glass panel; and
   a perforated opaque object located adjacent said UV light source, such that UV light rays passing through the perforated object cast onto the planar surface of said glass panel a UV shadow visible to birds.

2. The system according to claim 1, wherein said glass panel comprises a multi-pane window.

3. The system according to claim 2, and comprising an elongated spacer separating adjacent panes of said multi-pane window.

4. The system according to claim 3, wherein said UV light source comprises a UV LED light strip residing adjacent said spacer inside of said multi-pane window.

5. The system according to claim 4, wherein said UV LED light strip comprises a plurality of spaced linear UV LED chips operatively mounted on a flexible printed circuit board.

6. The system according to claim 5, wherein said flexible printed circuit board comprises an adhesive backing configured to adhere said UV LED light strip to said spacer inside of said multi-pane window.

7. The system according to claim 6, wherein said perforated opaque object comprises a plastic mesh strip substantially coextensive with said UV LED light strip.

8. The system according to claim 1, wherein said UV light source generates light rays with a wavelength less than 420 nanometers.

9. The system according to claim 1, wherein said UV light source generates light rays covering a wavelength spectrum from about 100 nanometers to about 400 nanometers.

10. The system according to claim 1, wherein said UV light source generates UV-A light rays.

11. A system for reducing bird collisions with glazing, said system comprising:
   a housing;
   a UV light source located within said housing and configured to project UV light rays onto a planar surface of the glass panel; and
   a perforated opaque object located in a path of UV light rays generated by said UV light source, such that UV light rays passing through the perforated object cast onto the planar surface of said glass panel a UV shadow visible to birds.

12. The system according to claim 11, wherein said UV light source comprises a UV LED light strip.

13. The system according to claim 12, wherein said UV LED light strip comprises a plurality of spaced linear UV LED chips operatively mounted on a flexible printed circuit board.

14. The system according to claim 13, wherein said flexible printed circuit board comprises an adhesive backing configured to adhere said UV LED light strip to said housing.

15. The system according to claim 14, wherein said perforated opaque object comprises a plastic mesh strip substantially coextensive with said UV LED light strip.

16. The system according to claim 11, wherein said UV light source generates light rays with a wavelength less than 420 nanometers.

17. A method for reducing bird collisions with glazing, said method comprising:
   projecting UV light rays from a UV light source onto a planar surface of a glass panel;
   locating a perforated opaque object between the UV light source and the planar surface of the glass panel, such that UV light rays passing through the perforated object cast onto the planar surface of the glass panel a UV shadow visible to birds.

18. The method according to claim 17, wherein the UV light source comprises a UV LED light strip.

19. The method according to claim 18, wherein the UV LED light strip comprises a plurality of spaced linear UV LED chips operatively mounted on a flexible printed circuit board.

20. The method according to claim 19, wherein the perforated opaque object comprises a plastic mesh strip substantially coextensive with the UV LED light strip.

* * * * *